Dec. 10, 1963  J. L. BOLFAR  3,113,386
LOCK TUMBLER PIN GAUGE DEVICE

Filed Nov. 8, 1960  3 Sheets-Sheet 1

JOHN L. BOLFAR
INVENTOR

BY Walter G. Finch
ATTORNEY

Dec. 10, 1963   J. L. BOLFAR   3,113,386
LOCK TUMBLER PIN GAUGE DEVICE
Filed Nov. 8, 1960   3 Sheets-Sheet 2
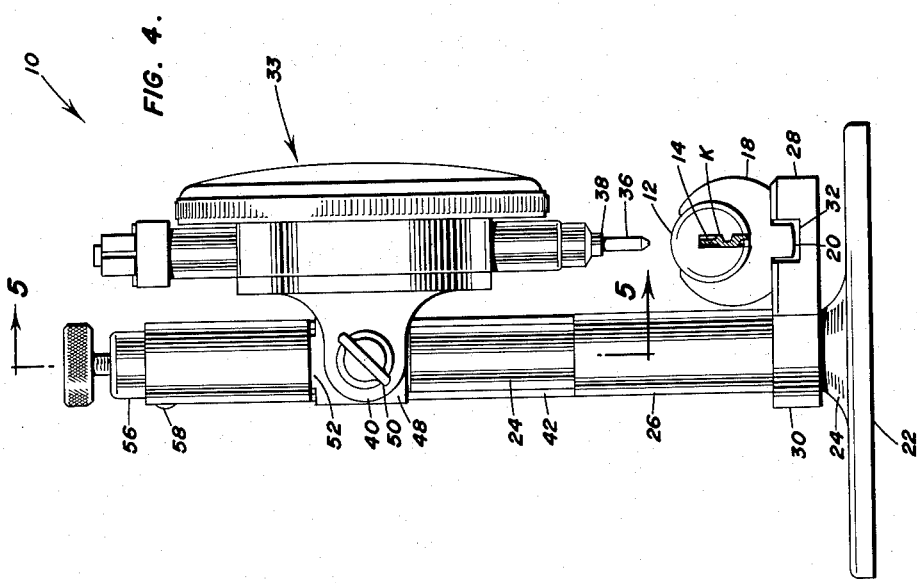
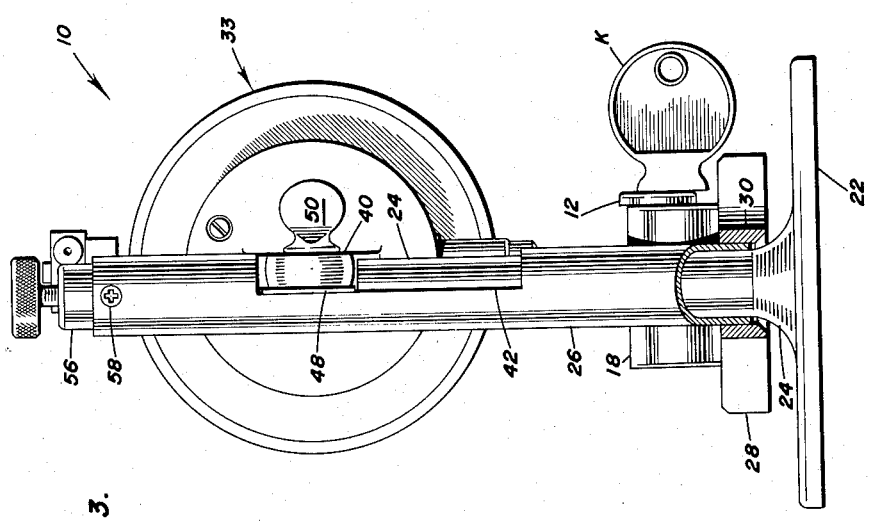
JOHN L. BOLFAR
INVENTOR
BY Walter G. Finch
ATTORNEY Dec. 10, 1963    J. L. BOLFAR    3,113,386
LOCK TUMBLER PIN GAUGE DEVICE
Filed Nov. 8, 1960    3 Sheets-Sheet 3

INVENTOR
JOHN L. BOLFAR
BY Walter G. Finch
ATTORNEY

United States Patent Office 3,113,386
Patented Dec. 10, 1963

3,113,386
LOCK TUMBLER PIN GAUGE DEVICE
John L. Belfar, 1613 W. Pratt St., Baltimore, Md.
Filed Nov. 8, 1960, Ser. No. 67,973
7 Claims. (Cl. 33—172)

This invention relates generally to cylinder pin-tumbler lock devices, and more particularly it pertains to pin gauges for locksmiths.

Depth gauges have recently come into use for accurate measurement of the pin hole in lock cylinder plug with key inserted to determine the correct choice of pin. Prior to this, it was necessary for a locksmith to furnish the correct pin by inserting pins of various lengths. When the correct pin was not at hand, the locksmith chose a longer pin and then corrected the length thereof by filing it to the required size in a pin vise or by filing the pin while in the cylinder plug. Both methods were time-consuming. The latter method often resulted in material being removed from the surface of the cylinder plug, and thus reduced the security, because of the increased tolerance between the plug and the cylinder case, plus poor operation of the lock during subsequent use thereof.

Pins are now available in stock increments of length (in sizes of .005" graduations) ready for assembly. In addition, the previously mentioned depth gauge is used to make the selection and check the resulting choice. However, for precise gauging, the surface of the plug must be held at right angles to the depth feeler of the gauge, which is difficult to do by hand. Another difficulty encountered by the locksmith is the frequent loss of the pins from the cylinder plug if it must be held by the fingers of the operator while the gauging and pin loading operation is taking place.

Accordingly, it is an object of the present invention to provide a lock tumbler pin gauge which automatically holds a lock cylinder plug in gauging, loading, and checking positions so that the required pin size or the check of the fit of a pin is displayed for an indefinite period and so the pins thus determined may be easily loaded.

Another object of this invention is to provide a post type positionable work holder for a dial gauge which automatically holds a work piece to a reference stop.

Yet another object of this invention is to provide a spring-operated urging member located intermediate a pair of telescoping members which is effective in only a narrow portion of their telescoping range.

These and other objects and attendant advantages of this invention will become more readily apparent and understood from the accompanying specification and drawings in which:

FIG. 3 is a rear elevation, partly in section, of the pin gauge of FIG. 1;

FIG. 4 is a side elevation of the pin gauge of FIG. 1;

Figure 1:
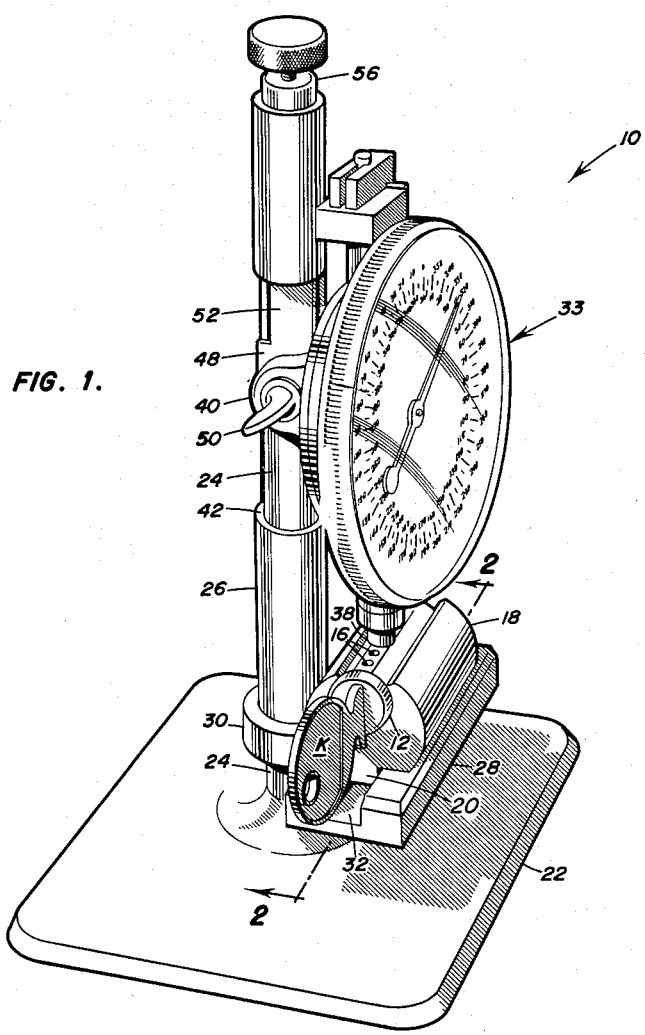
FIG. 1 is a perspective view of a lock tumbler pin gauge incorporating features of this invention and showing a ways table in a raised position.
Figure 2:
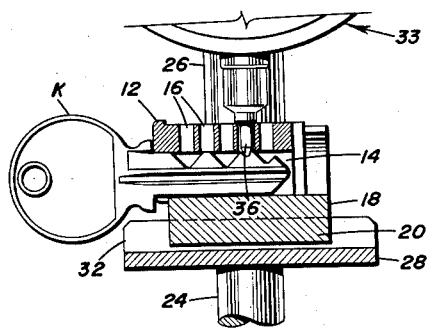
FIG. 2 is a fragmentary lateral section taken along line 2—2 of FIG. 1.

A properly dimensioned tumbler pin for a cylinder type lock will rest on the key and will be flush with the surface of the cylinder. Cylinder plug rotation in the assembled lock is impossible if the pin is only a few thousandths of an inch too short or too long. Either the follow-up pins or the tumbler pins cross the cylinder plug periphery and produce the "lock" interference in such cases.

As shown in FIGS. 1 to 4, a dial gauge assembly 33 is used to probe and accurately measure the tumbler pin apertures 16 of a lock cylinder plug 12 when a new key code is being fitted. The dial gauge assembly 33, well known to the art, indicates the protrusions of a depth feeler 36 beyond a reference stop 38. For accurate measurement, the lock cylinder plug 12 having a key K positioned in its key slot 14 must be held firmly and squarely against the stop 38. The invention, designated generally by reference numeral 10, accomplishes this holding operation automatically.

The dial gauge assembly 33 is secured by a mounting boss 40 and a thumb screw 50 to the top of a post 24. The post 24 is mounted vertically on a base 22 and a sleeve 26 is further supported thereon in a telescopic sliding fit. A ways table 28 having a mounting boss is press fitted to the lower extremity of the sleeve 26 and it extends beneath the gauge assembly 33 as shown best in FIGS. 3 and 4. A groove 32 is provided in the ways table 28, and it extends horizontally in the top thereof to receive a tongue 20 of a plug vise 18.

The sleeve 26 is provided with an elongated cutout 42 to provide clearance for a mounting boss 40. A wide, flat, latching strap 48 is positioned against the sides of the cutout 42 and it is secured between the mounting boss 40 and a flat faced notch 44 at the top of post 24, shown best in FIGS. 5 and 6. Strap 48, as shown best in FIGS. 3 and 4, restricts the rotation of the sleeve 26 without interfering with its sliding fit on post 24.

From the foregoing it is apparent that the ways table 28 with the plug vise 18, the cylinder plug 12 and the key K can be raised toward the depth feeler 36 of the gauge assembly 33.

Figure 5:
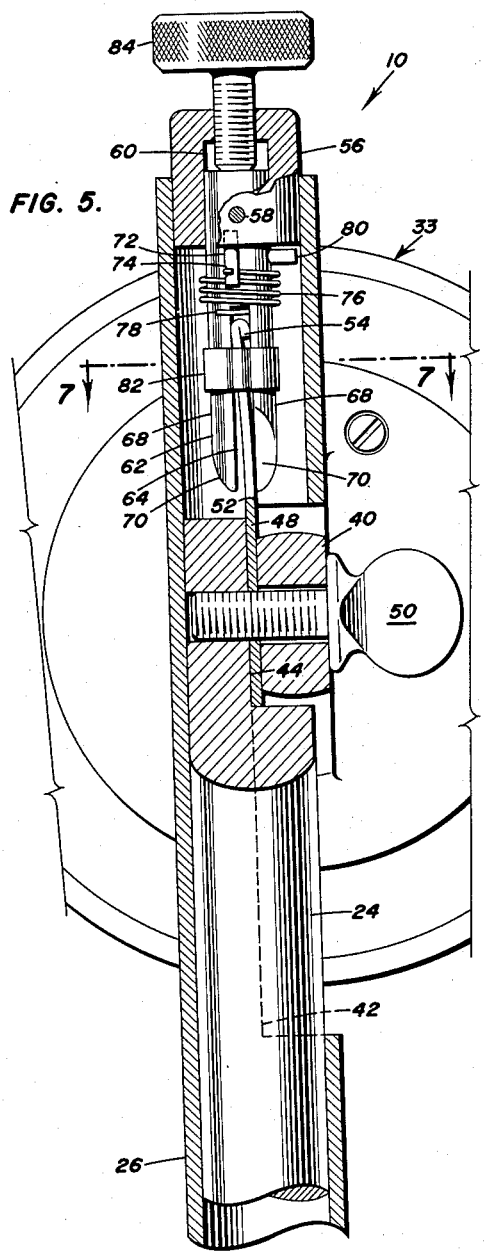
FIG. 5 is an enlarged fragmentary vertical section taken along line 5—5 of FIG. 4 showing the telescoping sleeve in lowered position.

In the lowered position shown in FIGS. 3, 4 and 5, a reduced upper portion 52 of strap 48 projects upwardly within the sleeve 26 and into a slot 64 of a bifurcated latching dowel 62 positioned therein. This dowel 62 is freely supported for lengthwise movement and axial rotation thereof in a bore 60 of a plug 56. The plug 56, in turn, is secured in the top of sleeve 26 by means of a setscrew 58, shown best in FIGS. 5 and 6.

A coil spring 76 surrounds the dowel 62 about midway of its length, and it is supported in a notch 74 of a pin 72 which is pressed into the lower end of plug 56. The spring 76 is wound about four turns, and the driving leg 78 thereof extends within the legs 68 of the dowel 62, thus tending to rotate it.

Figure 6:
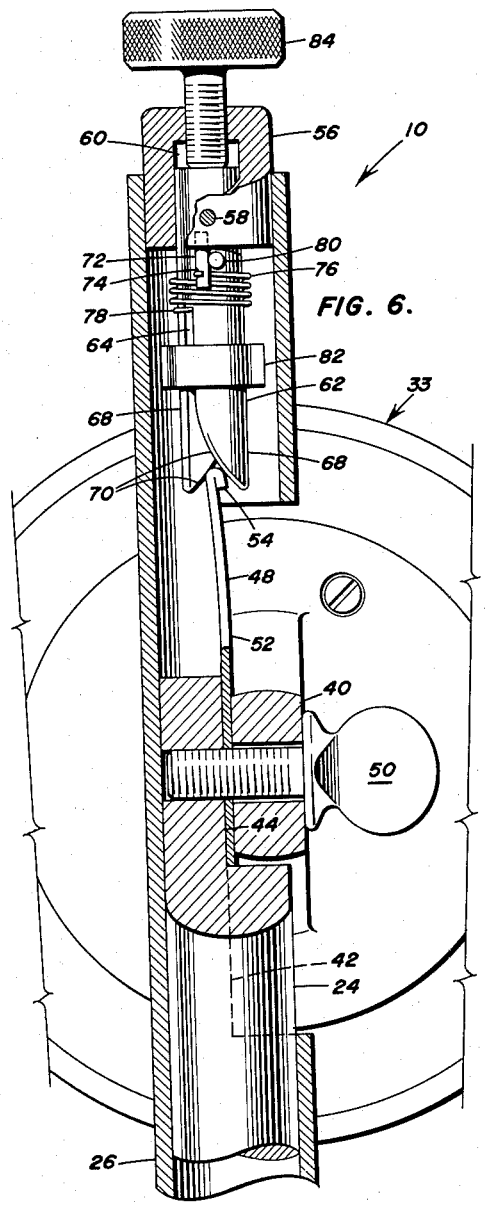
FIG. 6 is a view similar to that of FIG. 5 showing the telescoping sleeve in raised position.

A fold or bead 54 is provided at the upper extremity of the latching strap 48. When the ways table 28 together with the sleeve 26 are raised, the dowel 62 moves upwardly to withdraw from the engaging latching strap 48. The lower ends of the legs 68 of the dowel 62 are formed with opposing camming faces 70. Therefore, when the fold or bead 54 moves to a point where it engages these faces 70, the spring urged dowel 62 rotates to provide a vertical downward thrust against the latching strap 48 as best shown in FIG. 6.

The location of this thrust can be adjusted within limits by positioning the dowel 62 vertically within the plug 56 by means of a thumbscrew 84. The preferred setting occurs in a range of about one eighth inch before the lock plug 12 contacts the reference stop 38, and results in a positive contact therebetween as required for accurate tumbler pin gauging. This thrust is adequate to support the ways table 28 in the raised position while the operator reads the dial of the dial gauge assembly and selects the stock tumbler pin.

Figure 7:
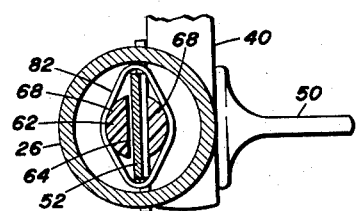
FIG. 7 is a cross-section taken along line 7—7 of FIG. 5.

An anti-rotation stop pin 80 prevents further rotation of the dowel 62 should an empty ways table 28 be raised so the fold or head is completely clear of the legs 68. An anti-spread band 82, as best shown in FIG. 7, is useful in preventing spread of the legs 68 especially when the dowel 62 is fabricated from a low-friction material such as plastic, including nylon and equivalent materials.

Departures from the embodiment described will follow with ease. For example, the positions of the spring-urged dowel 62 and the latching strap may be interchanged. It is also obvious to those skilled in the art that the cam faces and contiguous notch may be replaced by a wide pitch screw thread with adjacent portions of infinite pitch or the cam faces may be volute portions of a flat bar or the diagonally cut edges of tubing.

Obviously many modifications and variations of the present invention are possible in light of the above teachings. It is, therefore, to be understood that within the scope of the appended claims the invention may be practiced otherwise than as specifically described.

What is claimed is:

1. A depth gauge device for automatically gauging an object, comprising, a base, a mounting post on said base, telescoping means including a sleeve mounted on said post and having one end extending upwardly therefrom, said sleeve having a cutout therein intermediate its ends, means including a strap positioned across said cutout and having its lower end secured to said post upper end extending upwardly into said sleeve, a dial gauge assembly mounted on said post and having an indicating dial and a vertically moving depth feeler coupled to said indicating dial and a reference surface for said depth feeler, means including a ways table for receiving an object to be gauged and extending outwardly from said sleeve and positioned below said depth feeler of said dial gauge assembly, means including a biasing element in the upper end of said sleeve for engaging the upper end of said strap extending upwardly therein to momentarily urge said ways table and object upwardly in their travel against said reference surface for said depth feeler of said depth dial gauge assembly during gauging of the object by the depth feeler, and means for adjusting said biasing element to define the limit of travel of the urging of said ways table and object upwardly in their travel against said reference surface.

2. A depth gauge device for automatically gauging an object, comprising, a base, a mounting post extending vertically from said base, means including a sleeve mounted on said post in a telescopic sliding fit and having one end extending upwardly therefrom, said sleeve having a cutout therein intermediate its ends, a latching strap positioned across said cutout and having its lower end secured to said post and its upper end extending upwardly into said sleeve, a dial gauge assembly mounted on said post and having an indicating dial and a vertically moving depth feeler coupled to said indicating dial and a reference surface for said depth feeler, means including a ways table for receiving an object to be gauged and extending outwardly from said sleeve and positioned below said depth feeler of said dial gauge assembly, said ways table having a groove provided therein, means including a biasing element in the upper end of said sleeve for engaging said upper end of said latching strap extending upwardly therein to momentarily urge said ways table and object upwardly in their travel against said reference surface for said depth feeler of said dial gauge assembly during gauging of said object by said depth feeler, and means for adjusting said biasing element to define the limit of travel of the urging of said ways table and object upwardly in their travel against said reference surface.

3. A lock tumbler pin gauge device for automatically holding a lock cylinder plug in gauging, loading and checking positions, comprising, a base, a mounting post extending vertically from said base, means including a sleeve mounted on said post in a telescopic sliding fit and having one end extending upwardly therefrom, said sleeve having a cutout provided therein intermediate its ends, a latching strap positioned across said cutout and having its lower end secured to said post and its upper end extending upwardly into said sleeve, a dial gauge assembly mounted on said post and having an indicating dial and a vertically moving depth feeler coupled to said indicating dial and a reference surface for said depth feeler, means including a ways table for receiving a lock cylinder plug and extending outwardly from said sleeve and positioned below said depth feeler of said dial gauge assembly, means including a biasing element in the upper end of said sleeve for engaging said end of said strap extending upwardly therein to momentarily urge said ways table and said lock cylinder plug upwardly in their travel against said reference surface of said dial gauge assembly during gauging of said object by said depth feeler, and means for adjusting said biasing element to define the limit of travel of the urging of said ways table and object upwardly in their travel against said reference surface.

4. A lock tumbler pin gauge device for automatically holding a lock cylinder plug in gauging, loading and checking positions, comprising, a base, a mounting post on said base, telescoping means including a sleeve mounted on said post and having one end extending upwardly therefrom, said sleeve having a cutout provided therein intermediate its ends, means including a strap positioned across said cutout and having its lower end secured to said post and its upper end extending upwardly into said sleeve, a gauge dial assembly mounted on said post and having an indicating dial and a depth feeler coupled to said indicating dial and a reference surface for said depth feeler, means including a ways table extending outwardly from said sleeve and positioned below said depth feeler of said dial gauge assembly, said ways table having a groove provided therein, a vise for said lock cylinder plug, said vise having a tongue receivable in said groove of said ways table, means including a biasing element in the upper end of said sleeve for engaging the upper end of said strap extending upwardly therein to momentarily urge said ways table and lock cylinder plug upwardly in their travel against said reference surface of said dial gauge assembly during gauging of said lock cylinder plug by said depth feeler, and means for adjusting said biasing element to define the limit of travel of the urging of said ways table and object upwardly in their travel against said reference surface.

5. A lock tumbler pin gauge device for automatically holding a lock cylinder plug in gauging, loading and checking positions, comprising, a base, a mounting post extending vertically from said base, means including a sleeve mounted on said post in a telescopic sliding fit and having one end extending upwardly therefrom, said sleeve having a cutout provided therein intermediate its ends, a latching strap positioned across said cutout and having its lower end secured to said post and its upper end extending upwardly into said sleeve, a dial gauge assembly mounted on said latching strap and having an indicating dial and a vertically moving depth feeler coupled to said indicating dial and a reference surface for said depth feeler, means including a ways table extending outwardly from said sleeve and positioned below said depth feeler of said dial gauge assembly, said ways table having a groove provided therein, a plug vise for said lock cylinder plug, said plug vise having a tongue receivable in said groove of said ways table, means including a biasing element in the upper end of said sleeve for engaging said upper end of said strap extending upwardly therein to momentarily urge said ways table and cylinder plug in their travel upwardly against said reference surface of said dial gauge assembly, and means for adjusting said biasing element to define the limit of travel of the urging of said ways table and object upwardly in their travel against said reference surface.

6. A depth gauge device for automatically gauging an object, comprising, a base, a mounting post on said base, telescoping means including a sleeve mounted on said post and having one end extending upwardly therefrom, said sleeve having a cutout therein intermediate its ends, means including a strap secured to said post and positioned across said cutout and having a portion extending upwardly into said sleeve, a dial gauge assembly pivotally mounted on the portion of said strap positioned across said cutout, and having an indicating dial, a vertically moving depth feeler coupled to said indicating dial, and a reference surface for said depth feeler, means including a ways table for receiving an object to be gauged and extending outwardly from said sleeve and positioned below said depth feeler of said dial gauge assembly, and means including a biasing element secured to said sleeve within the upper end thereof, said biasing element having a bifurcated portion at its lower end, said bifurcation having substantially parallel opposed inner sidewalls at the upper end thereof to engage said portion of said strap extending upwardly into said sleeve when said sleeve and post are telescoped together and said inner sidewalls terminating into opposed camming faces at the lower end of said bifurcation, whereby when said sleeve is telescoped upwardly with respect to said post, the camming faces of said biasing element engage said strap to bias said sleeve upwardly to cause said object to be gauged to move against said reference surface of the dial gauge assembly.

7. A depth gauge device for automatically gauging an object as recited in claim 6, and means including a bead at the upper end of said upwardly extending strap to facilitate the biasing of said ways table and object upwardly momentarily.

References Cited in the file of this patent
UNITED STATES PATENTS

| | | |
|---|---|---|
| 802,470 | Picard | Oct. 24, 1905 |
| 2,397,494 | Kuppersmith | Apr. 2, 1946 |
| 2,548,917 | Spall | Apr. 17, 1951 |